Jan. 21, 1936.  G. F. McDOUGALL  2,028,463
CHANGE PITCH PROPELLER
Filed Jan. 7, 1935  5 Sheets-Sheet 1
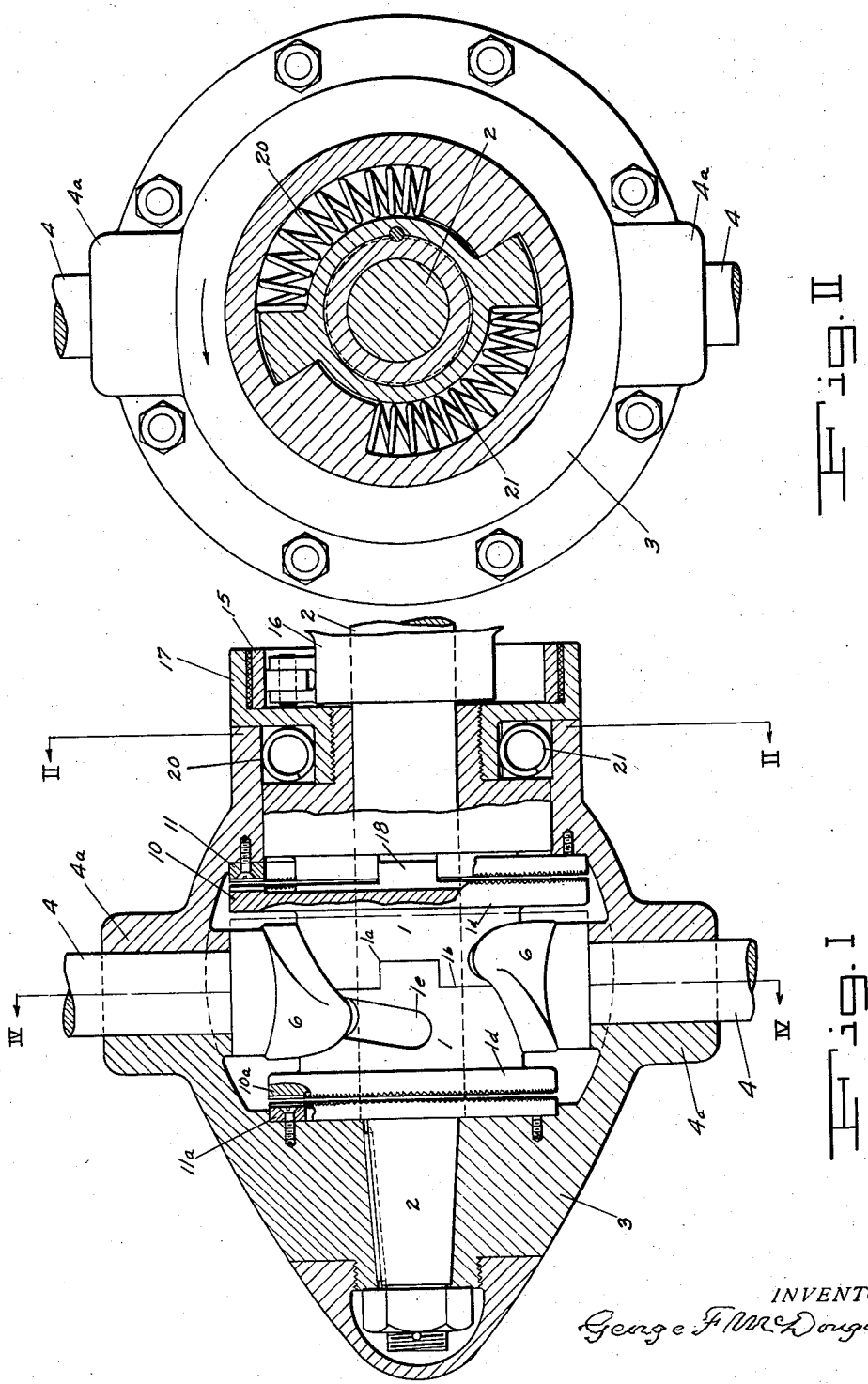
INVENTOR
George F. McDougall

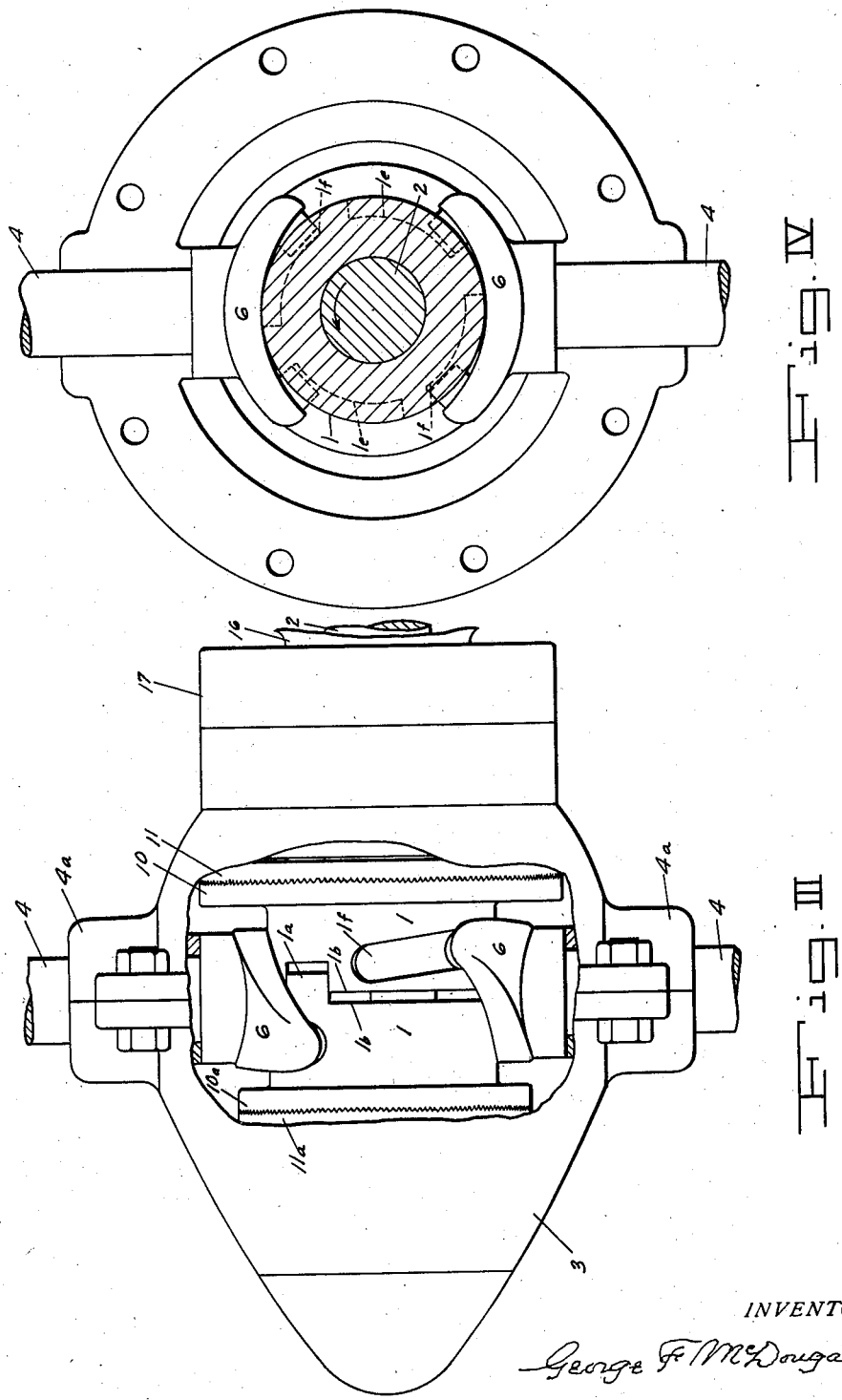

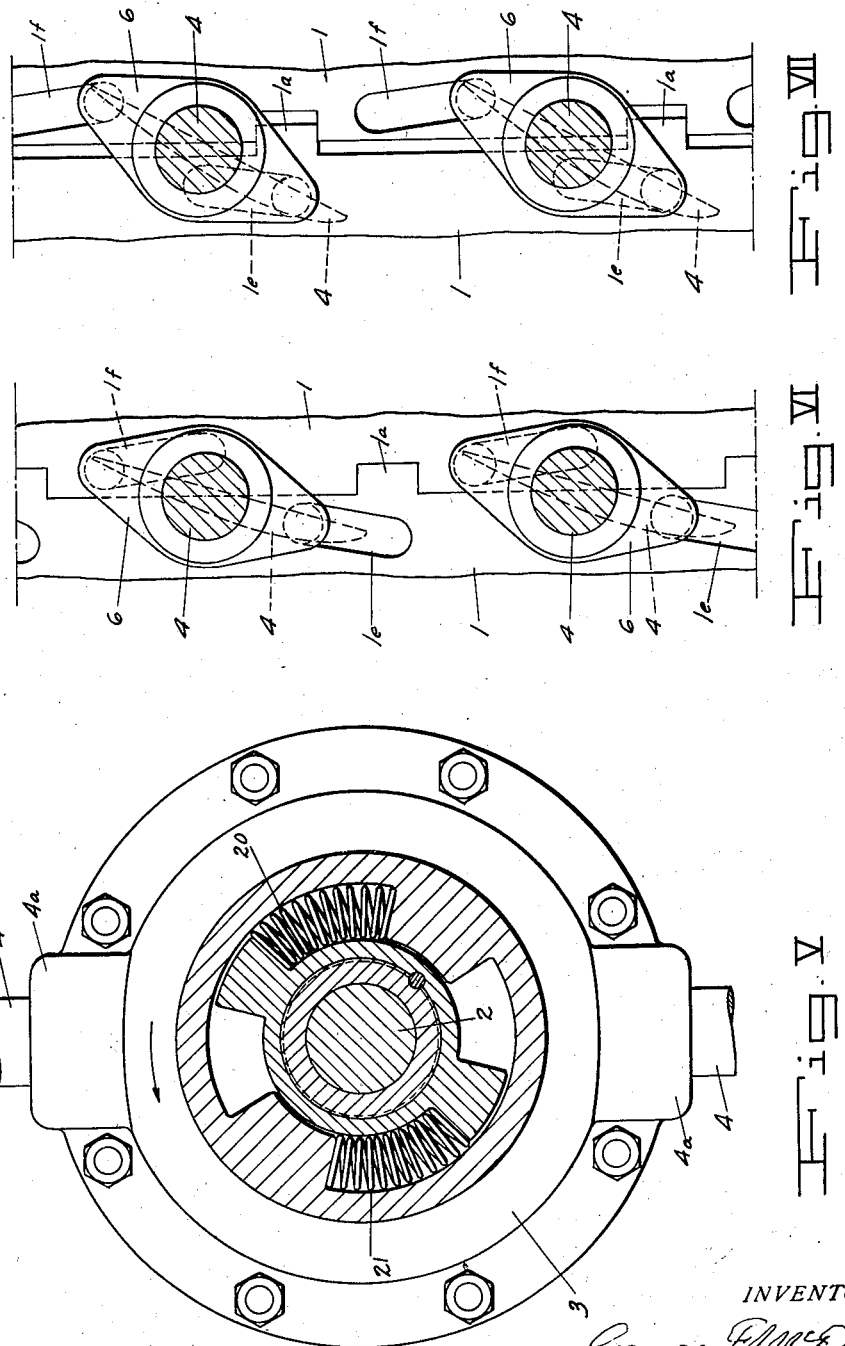

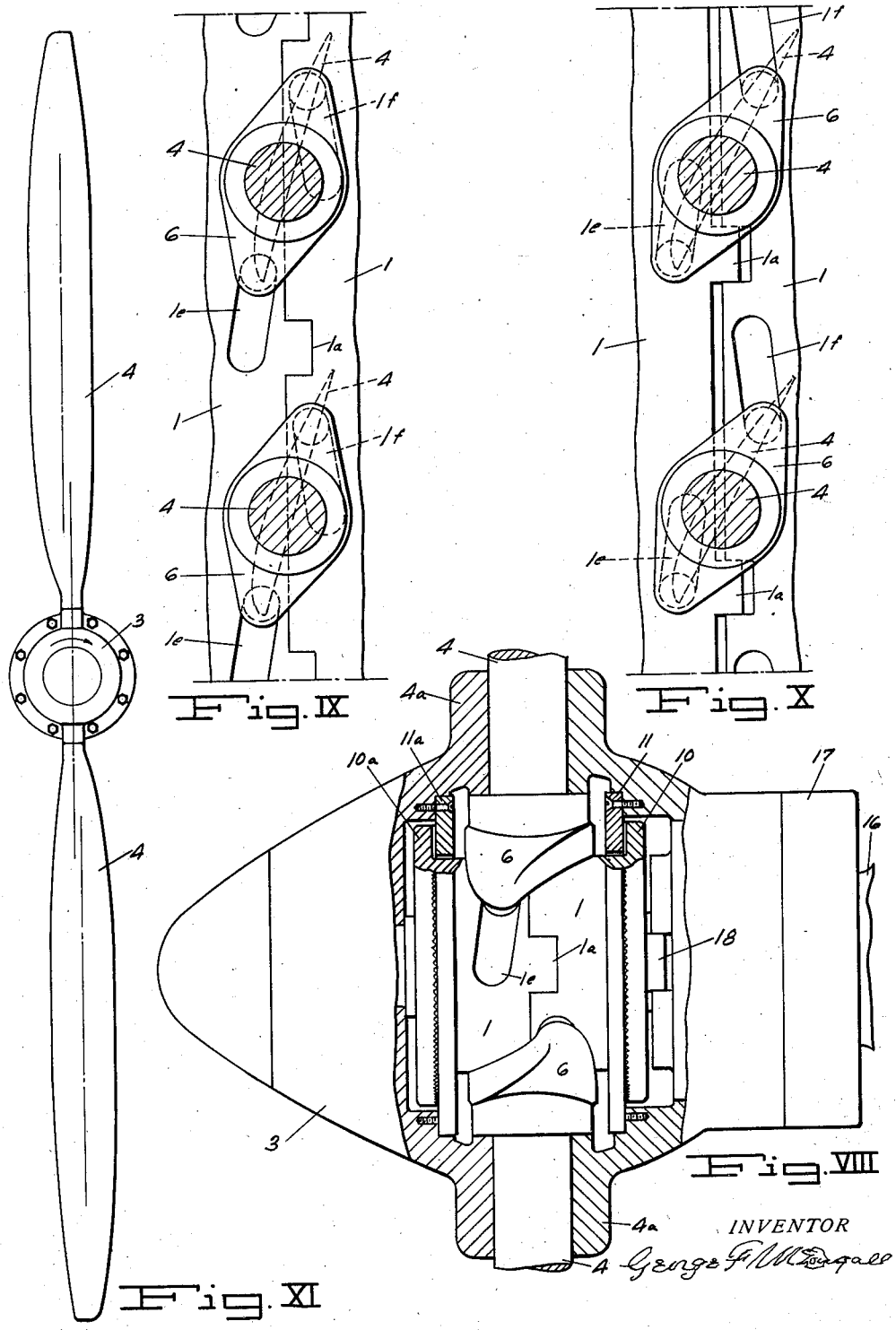

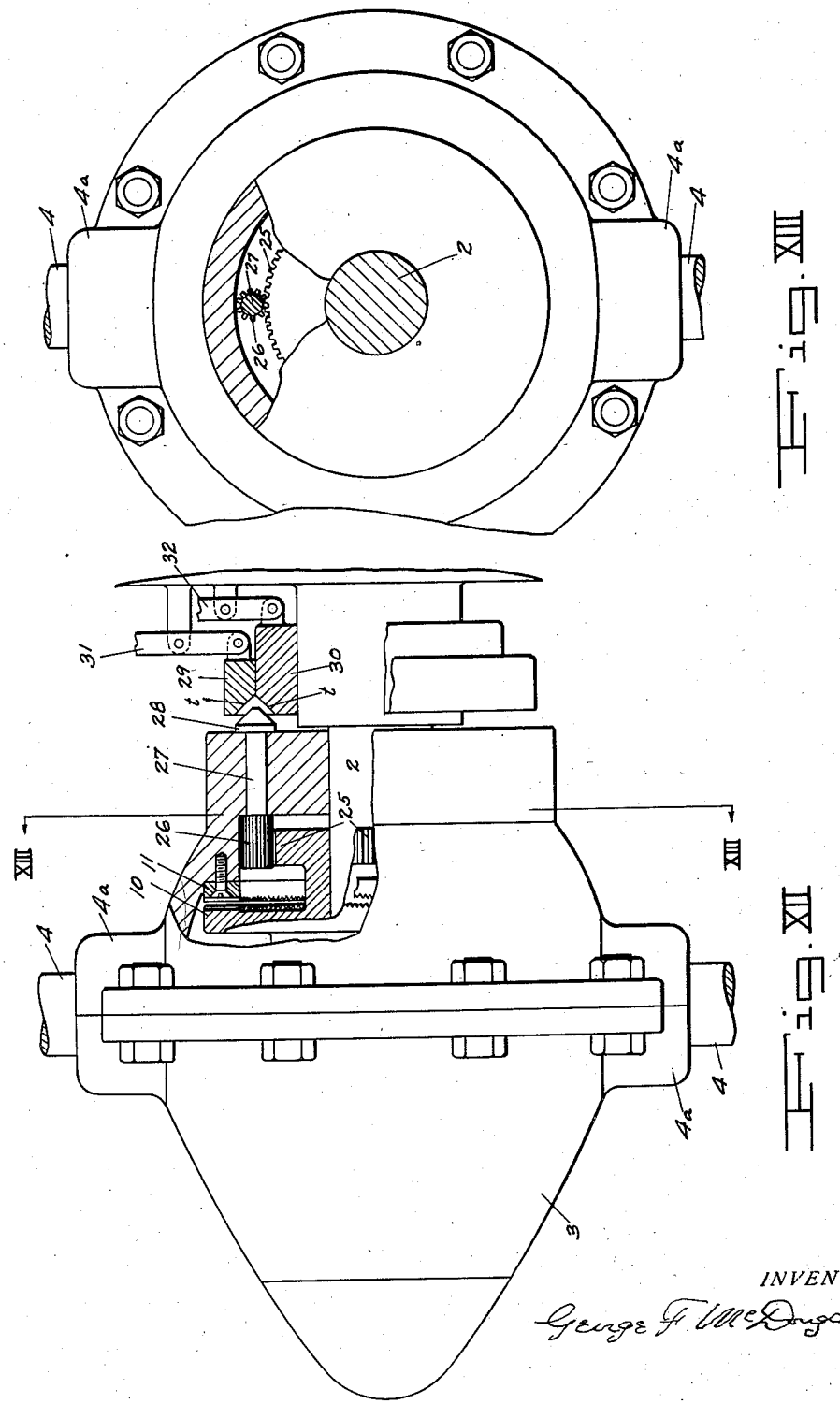

Patented Jan. 21, 1936

2,028,463

UNITED STATES PATENT OFFICE 2,028,463

CHANGE PITCH PROPELLER

George F. McDougall, Portland, Oreg., assignor to Edwin T. Hodge, Portland, Oreg.

Application January 7, 1935, Serial No. 657

16 Claims. (Cl. 170—163)

My invention relates to devices for changing the pitch or lead of an airplane propeller from a low or starting pitch to a high or cruising pitch, changing back as required and locking the propeller securely in selected pitch.

Various devices have been proposed for variable pitch propellers and it is well known that the desirable propeller pitch for landing and take-off is different from the pitch desired for cruising. I provide, positively, for only two pitches since a greater number is seldom necessary or desirable.

One of the objects of my invention is a propeller that has a minimum of moving parts with complete absence of thrust bearings and parts that are difficult to maintain.

Another object of my invention is a pitch change device that can only be changed from low to high pitch when the airplane to which it is attached is traveling through the air at considerable speed.

Another object of my invention is a pitch change device that will instantly and automatically resume low pitch characteristics when the engine is idling as for example when the airplane is cruising and the propeller speed is reduced to a point less than the air speed, momentarily, or when the propeller is at rest as for example when the motor is not running.

Another object of my invention is a pitch change device wherein the power of the engine is utilized to change from one pitch to another.

A most important object of my invention is a pitch change device wherein when positively acting the propeller blades are firmly locked in selected position and will therefore remain in that position so long as the propeller is pulling or pushing the plane, but will automatically unlock preparatory to a change of pitch if the engine is momentarily idled while proceeding through the air, and that will lock in either pitch position the instant any load is accepted by the propeller blades.

Another object is a pitch change device that is equally suited for a two, three or four blade propeller without the addition of any more moving parts to control the larger number of blades.

Another object is a device of the character described wherein the change from low to high pitch is practically instantaneously effected by engine power and controlled by a small easily operated lever or pedal.

Another important object of this invention is a device that will advance each propeller blade exactly as much as any other blade, so that the pitch is precisely predetermined, to avoid unequal loading and consequent fluttering of the blades, and will always have a workable pitch in case of complete failure of the pitch changing device.

These and other objects will be apparent from the following specification and claims.

Drawings showing the principal invention herein contained illustrate and describe two species of mechanical devices for making use of it. With the two types of operating apparatus there is to some extent two different modes of operation and if desired some change in result.

In the drawings, Fig. I is a longitudinal section of my new propeller showing what I consider to be the main invention with the brake type of operating device;

Fig. II is a section on line II—II of Fig. I;

Fig. III is a view of the same structure shown in Fig. I partly sectioned to show the cam I in operated position that it will assume under positive load of the propeller when the blades are being used to propel the plane;

Fig. IV is a section on IV—IV of Fig. I to which it must be referred;

Fig. V is the same structure shown in Fig. II except that it shows the operated position of the interior parts as they will exist when the propeller is being operated according to Fig. III;

Fig. VI is a stretchout of the cam I, which is considered the principal invention herein, when it is co-operating with the propeller blade, the leading edge of which controls, but showing the blade at rest or revolving under negative load;

Fig. VII is the same stretchout shown in Fig. VI except that the cam I has rotated to change the pitch of the blades and the blades will be considered to be under positive load;

Fig. VIII is a somewhat different arrangement from that shown in Fig. III in that the main invention or cam I contracts to locking position under load as hereinafter explained;

Fig. IX is a stretchout of the cam I as it is being used in Fig. VIII with the propeller carrying a load;

Fig. X is the same stretchout shown in Fig. IX except that the cam I has rotated to a different position and moved the blades to a higher pitch;

Fig. XI is a front view of the propeller hub as shown in Figs. I, III, VIII and XII, to a smaller scale and with propeller blades attached, in this case with the propeller blades having a greater area on the trailing edge as required in Figs. IX and X on the same sheet;

Fig. XII is a view of substantially the same structure shown in Fig. I partly in section and delineates a different structure for controlling the cam 1 as hereinafter explained in detail;

Fig. XIII is a section on XIII—XIII of Fig. XII.

Referring to Fig. I: A driven propeller shaft 2 is made rigid within the nose of the hub 3 and drives through the hub 3 to cause revolution of a plurality of propeller blades 4, rotatively mounted on the hub 3. Within an appropriate chamber within the hub 3 is a two-part cam 1, arranged as for example at 1a, with an angular intercepting divisional surface so that it may be rotated as an unit but is freely expansible and contractible axially within the limits fixed by structure with which it will contact on expansion and by the two surfaces such as 1b coming in contact upon contraction.

The cam 1 is preferably drum-shaped and may have flanges as shown at 1d, and is equipped with angular cam slots 1e and 1f that are oppositely pitched. On the inner end of the propeller blade, a couple 6 is formed, integral therewith or rigidly attached thereto, one element of which engages with the slot 1f, in one part of the cam and the other element of which engages with the slot 1e in the other part of the cam.

It is evident that a semi-rotation of the cam 1 with respect to the hub 3 will cause an axial part revolution of the blade 4 to change the pitch of the blade.

It is also evident that the absolute limit of pitch change of the blade 4 is fixed by the definite ends of the cam slots 1e and 1f.

Also if the slots such as 1e and 1f are all accurately milled to like angles and proper length, then the shift of one propeller blade, 4, must be precisely the same as the shift of any other blade co-operating with the cam.

Taking the stretchout shown in Fig. VI and viewing it in connection with Fig. I and considering Fig. I to be intended to rotate in a clockwise direction when looking at the nose of the hub:—
If the speed of the air screw advance is less than air speed then the two parts of the cam 1 will be in the position shown in Fig. I in the stretchout shown in Fig. VI. This is the condition of negative load and can occur only when the propeller is proceeding through the air at less than air speed, or at rest. It will be noted that in Fig. VI the superior area of the propeller blade is toward the leading edge.

The moment that the propeller blades shown in dotted outline in Fig. VI and Fig. VII assume a positive load, whether or not the cam 1 has been rotated, the twisting moment on the couple 6 separates the two parts of the cam 1, axially and engages the locking rings 10 and 11 to rearward of the cam 1 and 10a and 11a on the forward end of the cam 1.

11 and 11a are rigidly attached to the hub 3 as shown, and 10 and 10a are made a part of the cam 1, each part of the cam having its own locking ring. The locking ring will be provided with teeth as shown which may be quite small but the angle of which should be greater than the angle of the cam slots 1e and 1f.

The clearance c is shown somewhat exaggerated in Fig. I and in actual practice it is arranged so that when the cam 1 is fully contracted as shown in Fig. I the relatively stationary part such as 11 and the relatively movable part such as 10 will just smoothly clear.

Since the turning moment of revolution applied to the blades comes from the hub 3 and not from the cam 1 there is no tendency to a displacement of revolution on the cam 1 by reason of the power applied to the blades 4 except that incident to the slope or angle of the slots 1e and 1f.

It will be observed by inspection of Fig. I that the cam 1 must be retarded with respect to the hub 3 in order to change from low to high pitch, and advanced with respect to the hub 3 to change back from high to low pitch.

With the apparatus as delineated in Fig. I and dependent views, this retardation is effected by means of the brake 15, which is attached to a relatively fixed part such as the engine hub 16 and which co-operates with the brake drum 17 under influence of brake operating means not shown. The brake drum 17 is operatively connected to the cam 1 by means of the jaw clutch 18.

It will be understood that the brake drum 17 revolves freely with the propeller hub when the same is in use and that the brake 15 remains relatively fixed with sufficient clearance so that there is no frictional load.

No apparatus has been shown for applying the brake 15 to the brake drum 17 as such appliances are well known, but it is suggested that where the propellers are remote from the control cabin or cockpit, such as out on the wings of the plane, that the well known hydraulic brake apparatus will provide an instantaneous and efficient way of applying the brake 15 to the drum 17.

Owing to the tremendous centrifugal loads on propeller blades due to high rotation and the very high bending moments at the root of the blades due to torque re-action and air resistance, it is not considered practicable to turn the blade 4 in its socket 4a while it is under positive load.

To use the apparatus delineated in Fig. I and subsidiary drawings the plane will take off with the propeller blade in normal low pitch and after attaining altitude and having leveled off for flying, the blades firmly locked in low pitch as heretofore explained, the plane may be nosed down a trifling amount to prevent loss of flying speed, the engine momentarily throttled, and as the propeller slows down and reaches air speed or very slightly below air speed, the turning moment on the area of the propeller blade will reverse which unlocks the cam 1 to the position shown in Fig. I. An instantaneous touch of the brake 15 against the brake drum 17 will retard the cam 1 to its position of high pitch, compressing the springs 20 and 21 and thus storing the force for returning the cam 1 to its normal position, shown in Fig. I.

While holding the braking effect sufficiently to maintain compression of the springs, 20 and 21, the pilot "guns" the engine. The propeller blade instantly acts as described for positive load, rocking slightly on its axis and relocking the surface 10, 11, 10a and 11a into high pitch position, the action being the same as starting a car on a hill. The propeller will thereafter remain locked as long as it is carrying a positive load; and if for any reason, controlled or uncontrollable, the propeller becomes under negative load, the springs 20 and 21 will instantly assert themselves to restore the cam 1 to the position shown in Fig. I and the blades to low pitch as shown in Fig. VI.

Also with this type of change apparatus we have a two pitch propeller as contradistinguished from a variable pitch propeller.

When the propeller is at rest it is normally at low pitch. It will lock itself into low pitch upon assuming a positive load when warming up, taking off or attaining altitude. It cannot be changed to high pitch except when in flight and will not remain in high pitch except under conditions of positive load, but may be selectively, instantly changed to high pitch at any time when the plane is proceeding through the air fast enough to sustain itself momentarily while the propeller is being changed.

In Fig. VIII is found a modification of the structure shown in Fig. I in that the cam 1 contracts to locking position instead of expanding as in Fig. I. To accomplish this change we here make the trailing edge of the blade of the greatest area as shown in Fig. XI which exactly reverses the conditions obtaining in Fig. I considered in view of the stretchout shown in Figs. VI and VII, the direction of rotation remaining the same, clockwise, as assumed for Fig. I.

It is thought that no further explanation of these views is necessary. Neither is it thought that it is necessary for a further detailed description of the couple, 6, since the term "couple" is well known to engineers and the drawings delineate a desirable shape where the balance of the apparatus is as shown in the several views.

Due to air compression on the rear of the blade, and a vacuum on the trailing edge occasioned by cavitation in front of the blade, there is normally a turning moment on a symmetrical blade in the same direction as obtains when the trailing edge of the blade has the greatest area. This is true while the blade is pulling positively but is not true when the blade is drifting or running at or less than air speed.

Hence it will be necessary if it is desired that the trailing edge control the lock that it be made of somewhat greater area than the leading edge. A somewhat larger disproportionate area will be required if the leading edge of the blade is to control as shown in Fig. I.

In Fig. XII is shown another apparatus for rotating the cam. It will be considered that the apparatus for rotating the cam delineated in Figs. XII and XIII is diagrammatic in its entirety. The cam will be the same in operating principle as that shown in Fig. I or it may be made according to that shown in Fig. VIII. In Fig. XII and somewhat to the rearward, the cam is shown as provided with a spur gear 25 which co-operates with the spur pinion 26 mounted upon a shaft, 27, journaled in the body of the hub 3; the shaft rotatively supporting a friction wheel 28. Revolution of this friction wheel will displace the cam with respect to the hub 3 and the blades 4.

Rotation is here shown, diagrammatically, to be accomplished by contacting either the ring 29 or the ring 30, each of which is equipped with a friction track arranged for sliding axially into frictional engagement with the friction wheel 28 under the influence of the levers 31 and 32. These rings may be operated by hydraulic or other convenient transmission means.

It will be desirable to have a high ratio of speed reduction between the shaft 27 and the cam 1 so that the change from high to low pitch, or reversely, may be accomplished over a sufficient period of time to allow the pilot some choice in the amount of pitch change movement applied to the cam 1. It will lock in any attained position as described when positive load is restored.

In this respect the device may be to some degree variable as distinguished from the two-pitch propeller as delineated in Fig. I.

If the element 30 is engaged with the friction wheel 28, it will revolve in one direction and if the element 29 is engaged it will revolve in the opposite direction, but the load heretofore mentioned, due to torque and centrifugal loading effect on the blades may still prevent any satisfactory shifting of the blades without reducing propeller speed to approximately air speed, when the bending moment and the centrifugal loading will be greatly reduced.

With the apparatus just described it will be better to make the blades so that a leading or a trailing edge of superior area will move the cam into locked position because, being impossible to make two blades exactly alike, there is always some vibration and vibration will tend to disturb the relation of the cam to the blades unless a positive lock is used.

Having delineated and described the best methods whereby I propose to carry out my invention at this time, what I claim as new and desire to secure by Letters Patent is:—

1. A change pitch propeller comprising in combination a blade, a blade shank that is rotatively mounted in a hub, a couple on the blade shank, an axially expansible two part cam rotatably mounted to co-operate with the couple with one element of the couple engaging one part of the cam and the other element of the couple engaging the other part of said cam, and means for shifting the cam to change the pitch of the blade.

2. A change pitch propeller comprising in combination a blade, a blade shank that is rotatively mounted in a hub, a couple on the blade shank, an axially expansible two part cam rotatably mounted to co-operate with the couple with one element of the couple engaging one part of the cam and the other element of the couple engaging the other part of said cam, and engine power operated means for shifting the cam to change the pitch of the blade.

3. A change pitch propeller comprising in combination a blade, a blade shank that is rotatively mounted in a hub, a couple on the blade shank, an axially expansible two part locking cam rotatably mounted to co-operate with the couple with one element of the couple engaging one part of the cam and the other element of the couple engaging the other part of said cam, means for shifting the cam to change the pitch of the blade and automatic means for returning the cam to its first position.

4. In a cam device for changing the pitch of a propeller blade, a couple made rigid with the blade, a pair of spaced cam engaging elements thereon, a two part cam member for influencing the blade, a cam slot in each part engageable with one of the said cam engaging elements, the said slots being oppositely pitched, and means for shifting the cam.

5. In a cam device for changing the pitch of a propeller blade, a cam engaging member made rigid with the blade, a pair of cam fingers spaced apart, a two part cam member for influencing the blade, a cam surface on each part engageable with a cam finger, the two parts of the cam member being oppositely axially movable under dynamic influence transmitted from the blade to engage a locking device under positive load and disengage the said locking device under negative load.

6. A changeable pitch propeller comprising in combination a hub, blade sockets in the hub, blades mounted in the said sockets that are rotatable therein, a cam device within the hub for selectively rotating the blades, a braking device for displacing the cam in one direction to rotate the blades, locking devices operable under dynamic influence received from the blades and spring devices for returning the blades to their original position upon cessation of dynamic influence.

7. A propeller of the change-pitch type comprising a propeller hub, blades radial to the hub and rotative in sockets formed in the hub, a drive shaft through the hub that is made rigid with the forward end thereof, a two part cam member loosely mounted on the shaft within the hub, cam engaging devices on the blades that are adapted to change the pitch of the blades upon relative rotation of the two part cam member, a braking device to retard the cam member with respect to the hub, shaft and blades, devices for locking the cam and blades in shifted position under the influence of positive load that are effective to unlock the cam under negative load, and reactive means for normally returning the cam to its first position when unlocked.

8. In a change pitch propeller having movable blades and cam devices for moving the blades into and out of a plurality of pitch positions, a brake for moving the cam, and means for selectively engaging the brake to change the pitch of the blades by retarding the cam to a different position with respect to the blades.

9. A two part drum cam for shifting propeller blades that is provided with centrally disposed intercepting divisional angular surfaces, cam surfaces on both parts of said drum cam, blade shifting devices engageable with said cam surfaces, said blade shifting devices being adapted to move the said drum cam axially to locked position under the influence of positive load on the propeller blades.

10. The combination as characterized in claim 9, in which axial relative movement of the drum cam parts engages relatively fixed locking devices to retain the said drum cam in adjusted position.

11. A cam for a change pitch propeller comprising a two part drum member with intercepting junction surfaces for synchronous rotary movement and independent axial movement, cam surfaces on each piece for engaging a couple on a blade and locking surfaces incorporated with the cam that are adapted to engage co-operating relatively fixed surfaces by axial movement of the cam parts.

12. A cam as characterized in claim 11 in combination with a braking device to retard the cam with respect to the couple and a spring to oppose retardation.

13. A two pitch propeller comprising a hub, radial blades pivotally mounted in the hub, a cam member adapted to change the pitch of the blades by relative rotary movement with respect to the hub, means for effecting such relative movement and means for reversing said movement, the said cam being axially movable to locking engagement with a relatively fixed part of the hub under dynamic influences from the blades when the said blades are under positive load.

14. A two pitch propeller comprising a hub, radial blades pivotally mounted in the hub, a two part cam member adapted to change the pitch of the blades by relative rotary movement with respect to the hub, means for effecting such relative movement and means for reversing said movement, the said cam parts being axially movable to locking engagement with a relatively fixed part of the hub under dynamic influences from the blades when the said blades are under positive load, and axially returnable to unlocked position under the influence of negative load on the said blades.

15. In a change pitch propeller, a two-part locking cam of the character described, a gear for moving the cam, a friction wheel for actuating the gear and means for selectively contacting the friction wheel to cause revolution in either direction.

16. A change pitch propeller defined in part as a hub, blades movably mounted on the hub, a two-part locking cam within the hub that is operatively connected to the blades, means integral with the blades for moving the cam to locked position under the influence of positive load on the blades, a gear device for moving said cam to change the blade pitch, a friction wheel for operating the gear device and means for selectively engaging the friction wheel to cause the same to revolve.

GEORGE F. McDOUGALL.